(12) United States Patent
Itagaki et al.

(10) Patent No.: US 8,489,785 B2
(45) Date of Patent: Jul. 16, 2013

(54) APPARATUS AND METHOD FOR WRITING DATA ONTO TAPE MEDIUM

(75) Inventors: Hiroshi Itagaki, Yamato (JP); Takashi Katagiri, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 12/433,606

(22) Filed: Apr. 30, 2009

(65) Prior Publication Data

US 2009/0296267 A1  Dec. 3, 2009

(30) Foreign Application Priority Data

May 2, 2008  (JP) ................................. 2008-120505

(51) Int. Cl.
*G06F 13/12* (2006.01)
*G06F 13/38* (2006.01)

(52) U.S. Cl.
USPC ......................................................... 710/74

(58) Field of Classification Search
None
See application file for complete search history.

(56) References Cited

U.S. PATENT DOCUMENTS

| | | | | |
|---|---|---|---|---|
| 5,553,266 | A * | 9/1996 | Metzger et al. ............... | 711/144 |
| 6,950,257 | B1 * | 9/2005 | Greco et al. .................... | 360/48 |
| 2002/0046344 | A1 * | 4/2002 | Naito ............................ | 713/189 |
| 2002/0103986 | A1 * | 8/2002 | Shimogori et al. ............... | 712/1 |
| 2003/0074521 | A1 * | 4/2003 | Beeston et al. ............... | 711/111 |
| 2003/0131175 | A1 * | 7/2003 | Heynemann et al. ......... | 710/310 |
| 2004/0225823 | A1 * | 11/2004 | Heynemann et al. ......... | 710/310 |
| 2004/0243760 | A1 * | 12/2004 | Dahman et al. ............... | 711/113 |
| 2006/0018227 | A1 * | 1/2006 | Nakajima ..................... | 369/53.2 |
| 2006/0087925 | A1 * | 4/2006 | Takai et al. ................. | 369/30.01 |
| 2006/0203367 | A1 * | 9/2006 | McAuliffe et al. ............. | 360/39 |
| 2006/0203797 | A1 * | 9/2006 | Abrol et al. ................... | 370/349 |
| 2007/0136517 | A1 * | 6/2007 | Edling .......................... | 711/111 |
| 2007/0136518 | A1 * | 6/2007 | Slater ........................... | 711/111 |
| 2008/0007856 | A1 * | 1/2008 | Tango et al. ..................... | 360/53 |
| 2008/0059144 | A1 * | 3/2008 | Earhart et al. ................... | 703/23 |
| 2008/0082736 | A1 * | 4/2008 | Chow et al. ................... | 711/103 |
| 2008/0082862 | A1 * | 4/2008 | Martens .......................... | 714/18 |
| 2010/0241770 | A1 * | 9/2010 | Tumblin et al. ................. | 710/52 |

FOREIGN PATENT DOCUMENTS

| | | |
|---|---|---|
| JP | 3222158 A | 10/1991 |
| JP | 5241736 A | 9/1993 |
| JP | 2007-95321 | 4/1995 |
| JP | 2006/065999 A | 3/2006 |

\* cited by examiner

*Primary Examiner* — Idriss N Alrobaye
*Assistant Examiner* — Ronald Modo
(74) *Attorney, Agent, or Firm* — Zilka-Kotab, PC

(57) ABSTRACT

In a controller of a tape drive, when a command processing unit receives a Write FM0 command, a channel input/output unit writes the data in the buffer and a speculative FM onto the tape, and a CM input/output unit records speculative FM presence information in a cartridge memory. When the command processing unit receives Write FM1 command next, the CM input/output unit erases the speculative FM presence information from the cartridge memory. When the command processing unit receives a command other than Write FM1 command next, the channel input/output unit overwrites a speculative FM.

20 Claims, 13 Drawing Sheets

If Expected Command Came

If Unexpected Command Came (1)

If Unexpected Command Came (2)

DS#N

DS#N

If Expected Command Came

DS#N             DS#N+1

Logical Overwrite

If Unexpected Command Came (1)

DS#N        DS#N+1

| EOD |

Logical Overwrite

If Unexpected Command Came (2)

APPARATUS AND METHOD FOR WRITING DATA ONTO TAPE MEDIUM

BACKGROUND OF THE INVENTION

1. Field of the Invention

The present invention relates to an apparatus and a method for writing data onto a tape medium, and more particularly, to an apparatus and a method for writing data in a buffer onto a tape medium according to a command from a host apparatus.

2. Background Information

A tape drive for writing data onto a tape medium such as a magnetic tape temporally stores data in a buffer and writes the data from the buffer to the tape medium at the timing which is convenient for the tape drive. A host sends a command for forcibly writing the data (WriteFM Non Immediate command) to the drive to ensure that all the data that has been sent to the drive is written out onto the tape medium. Such forcible writing from the buffer to the tape medium is called "synchronization".

If the tape medium is not stopped immediately after the synchronization, a gap is left on the tape medium between data that is written during preceding synchronization and subsequently written data. That wastes the recording area on the tape medium. That is why a backhitch needs to be performed. The backhitch refers to a series of operations such as slowing down the rewinding of the tape medium, temporally stopping the tape medium, rewinding the tape medium in the reverse direction, and then rewinding the tape medium in the original direction again to the location into which writing is to be performed, and writing the next piece of data. The next piece of data cannot be written until the backhitch is completed. As the backhitch takes about two or three seconds, involving the backhitch significantly influences the performance.

Various techniques to avoid the backhitch have been proposed. One technique involves a plurality of blocks of various sizes which are sent from a host apparatus are sequentially stored into a buffer which is divided into segments of a certain size, and when a segment is prepared by at least one block, the content of the segment is written onto a tape medium as a data set, and if the next segment is not prepared while the tape medium is rewound for four meters, a Null data set is written onto the tape medium within the four meters.

Some types of application program product that are used at a host apparatus serially send a first command, which instructs to forcibly write data in a buffer onto a tape medium, and a second command, which instructs to write delimiter information onto the tape medium, as commands to instruct the "synchronization". In such a case, as the data in the buffer is forcibly written out onto the tape medium according to the first command, the backhitch is involved. Further, as the delimiter information needs to be written onto the tape medium according to the second command, the backhitch is performed again. As writing of the next piece of data cannot start until the backhitch has been performed, performing the backhitch twice significantly influences the performance.

Thus, it would be desirable to reduce probability of involving backhitch twice when a command, which instructs to forcibly write data in a buffer onto a tape medium, and a command, which instructs to write delimiter information onto the tape medium are sent in serial.

SUMMARY OF THE INVENTION

In one embodiment, an apparatus for writing data in a buffer onto a tape medium according to a command from a host apparatus. The apparatus comprising: a receiving unit for receiving a first command and a second command from the host apparatus, wherein the first command instructs to forcibly write the data in the buffer onto the tape medium and the second command instructs to write delimiter information onto the tape medium; a writing unit for writing the data in the buffer and speculative delimiter information onto the tape medium in response to receipt of the first command; and a processing unit for performing processing to enable the speculative delimiter information to be dealt as valid delimiter information on condition that the receiving unit receives the second command after the first command.

In another embodiment, an apparatus for writing data in a buffer onto a tape medium according to a command from a host apparatus. The apparatus comprising: a receiving unit for receiving a first command and a second command from the host apparatus, wherein the first command instructs to forcibly write the data in the buffer onto the tape medium and the second command instructs to write delimiter information onto the tape medium; a writing unit for writing the data in the buffer and speculative delimiter information onto the tape medium in response to receipt of the first command; and a recording unit for recording information in memory that is provided for a cartridge, wherein the information indicates that the speculative delimiter information is written onto the tape medium by the writing unit, and the cartridge contains the tape medium; and a processing unit for performing processing to enable the speculative delimiter information to be dealt as valid delimiter information by erasing the information recorded in the memory on condition that the receiving unit receives the second command after the first command.

The present invention also provides a method for writing data in a buffer onto a tape medium according to a command from a host apparatus, comprising: writing the data in the buffer and speculative delimiter information onto the tape medium on condition that a first command is sent from the host apparatus, wherein the first command instructs to forcibly write the data in the buffer onto the tape medium; and enabling the speculative delimiter information to be dealt as valid delimiter information on condition that a second command is sent after the first command from the host apparatus, wherein the second command instructs to write delimiter information onto the tape medium.

In an alternative embodiment, a program product for causing a computer to function as an apparatus for writing data in a buffer onto a tape medium according to a command from a host apparatus, wherein the program product causes the computer to function as: receiving means for receiving a first command and a second command from the host apparatus, wherein the first command instructs to forcibly write the data in the buffer onto the tape medium and the second command instructs to write delimiter information onto the tape medium; writing means for writing the data in the buffer and speculative delimiter information onto the tape medium in response to receipt of the first command; and means for enabling the speculative delimiter information to be dealt as valid delimiter information on condition that the second command is received after the first command.

Other, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

Figure 1:
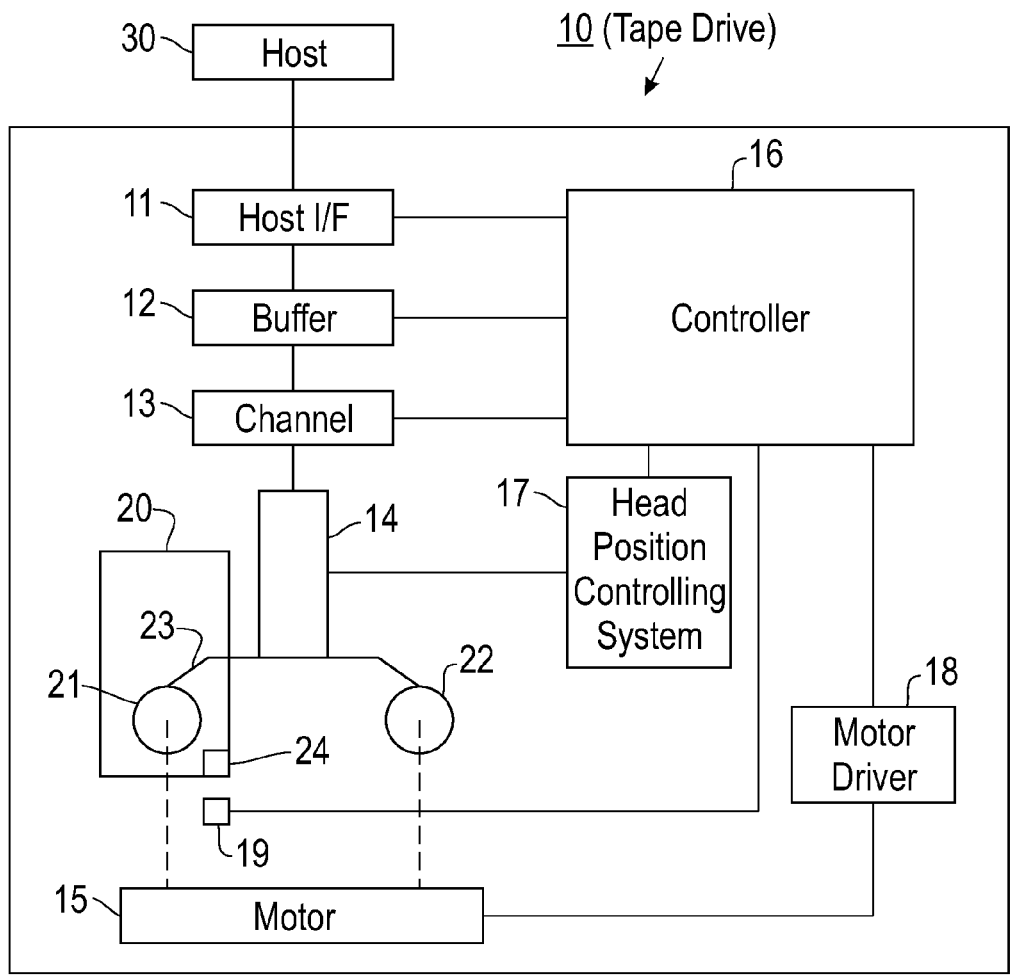
FIG. 1 is a block diagram showing a configuration of a tape drive to which an embodiment of the present invention is applied.

FIG. 1 is a diagram showing an exemplary configuration of a tape drive 10 to which the embodiment is applied. The tape drive 10 includes a host interface (hereinafter, referred to as "host I/F") 11, a buffer 12, a channel 13, a head 14, and a motor 15. It also includes a controller 16, a head position controlling system 17, and a motor driver 18. A tape cartridge 20 is also shown here, as the tape drive 10 can be loaded with the tape cartridge 20 by having the tape cartridge 20 inserted therein. The tape cartridge 20 includes a tape 23 wound onto reels 21 and 22. As the reels 21 and 22 rotate, the tape 23 is moved lengthwise from the reel 21 to the reel 22 or from the reel 22 to the reel 21. Although a magnetic tape exemplifies the tape 23 here, other tape media may be used.

The tape cartridge 20 also includes a cartridge memory 24 (a nonvolatile memory). The cartridge memory 24 records information on data written on the tape 23, for example. The cartridge memory 24 enables fast access to data therein by allowing indices of data on the tape 23, usage of the tape 23, and the like to be checked in a noncontact manner with an RF interface or the like. In the figure, an interface for accessing the cartridge memory 24 such as the RF interface is shown as a cartridge memory interface (hereinafter, referred to as "CMI/F") 19.

The host I/F 11 communicates with a host 30, which exemplifies the host apparatus. For example, the host I/F 11 receives a command for instructing to write data onto the tape 23, a command for instructing to wind the tape 23 to a desired position, or a command for instructing to read out data from the tape 23 from the host 30. SCSI exemplifies the communication standard used by the host I/F 11. In the case of SCSI, the first command corresponds to Write command, the second command corresponds to Locate command or Space command, and the third command corresponds to Read command. The host I/F 11 returns a reply whether processing corresponding to the command is successfully performed or not to the host 30.

The buffer 12 is memory for storing data that is to be written on the tape 23 or data that is read out from the tape 23. For example, the buffer 12 is made of DRAM (Dynamic Random Access Memory). The buffer 12 consists of a plurality of buffer segments each of which stores a data set, the unit of data read out from and written onto the tape 23.

The channel 13 is a communication path used in transferring data that is to be written on the tape 23 to the head 14 or receiving data that is read out from the tape 23 from the head 14.

The head 14 writes information onto the tape 23 or reads information out from the tape 23, while the tape 23 is moved lengthwise.

The motor 15 rotates the reels 21 and 22. Although the motor 15 is represented by a rectangular box in the figure, two motors 15 are preferably provided for the reels 21 and 22, respectively.

The controller 16 controls over the tape drive 10. For example, the controller 16 controls writing of data onto the tape 23 or reading of data out from the tape 23 according to a command received by the host I/F 11. The controller 16 also controls the head position controlling system 17 and a motor driver 18.

The head position controlling system 17 is a system for tracking desired one or more laps. A lap is a group of tracks on the tape 23. When the lap needs to be switched, the head 14 needs to be electrically switched. Such kinds of switch are controlled by the head position controlling system 17.

The motor driver 18 drives the motor 15. As described above, when two motors 15 are used, two motor drivers 18 are provided.

The CMI/F 19 is implemented by an RF reader/writer, for example. The CMI/F 19 writes information in the cartridge memory 24 and reads information out from the cartridge memory 24.

SCSI uses WriteFileMark Non Immediate commands for instructing to forcibly write the data in the buffer 12 onto the tape 23, other than Write command, Locate command, Space command, and Read command. FileMark (hereinafter, referred to as "FM") is delimiter information that indicates a delimiter for a unit of data written. WriteFM Non Immediate commands include WriteFM0 command and WriteFM1 command. WriteFM0 command is a command for instructing to forcibly write the data in the buffer 12 onto the tape 23 without FM. WriteFM1 command is a command for instructing to forcibly write FM with the data in the buffer 12 onto the tape 23.

Some application program products for running in the host 30 subsequently issue WriteFM0 command and WriteFM1 command. When that kind of application program product is used, the backhitch is involved to forcibly write the data in the buffer 12 onto the tape 23 according to WriteFM0 command. As the next WriteFM1 command requires to forcibly write FM onto the tape 23, the backhitch is involved again. In the case of TS1120 tape drive from International Business Machines Corporation in the United States, data is written onto a tape by a data unit called the data set. The case where the abovementioned backhitch is involved will be described in detail by taking a case where that kind of data writing is performed as an example.

Figure 2A:
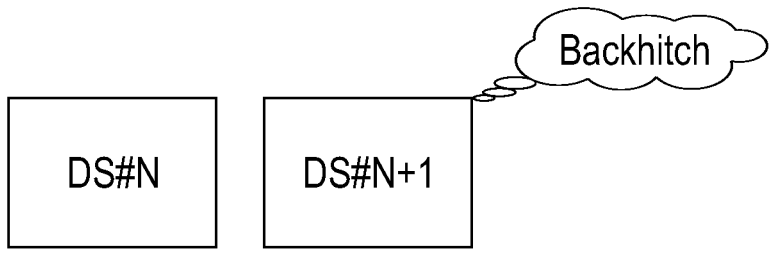
FIG. 2 is a diagram for illustrating the problems to be solved by the embodiment of the present invention.
Figure 2B:
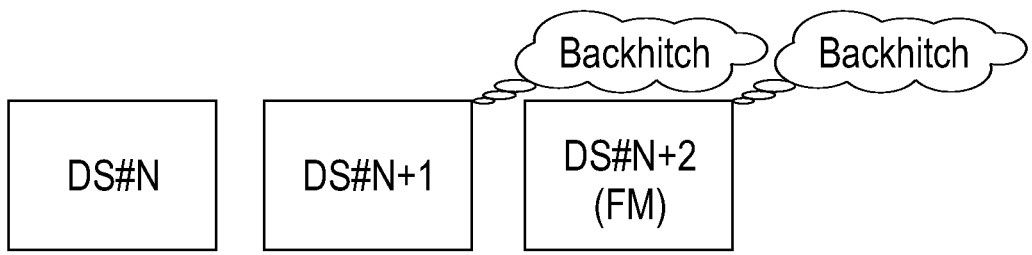
Figure 2C:
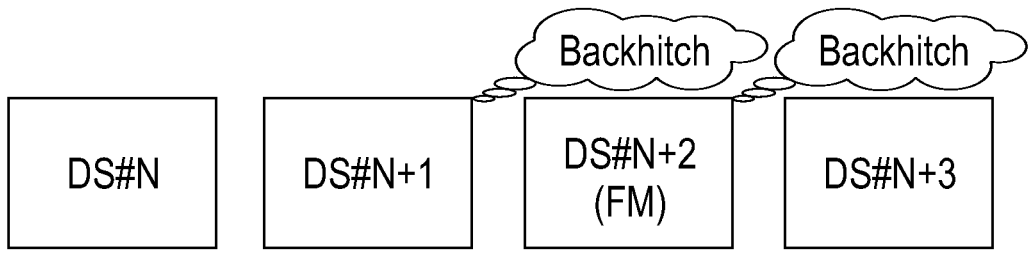

FIG. 2 is a diagram schematically showing a case where the backhitch is involved. "Data set" is denoted as "DS" in the figure, for convenience. It is assumed that WriteFM0 command is received when the first part of data DS#N+1 is stored. Then, the backhitch is performed as below: The rest part of DS#N+1 is padded, and DS#N+1 is forcibly written onto the tape 23 as shown in (a). It is assumed that WriteFM1 command is received subsequently. Then, after the completion of the above described backhitch, DS#N+2 is written onto the tape 23, and the backhitch is performed again as shown in (b). Here, DS#N+2 is a dataset which only includes FM with the rest part padded.

The write processing of DS#N+2 cannot be performed until the completion of the backhitch, which is involved after DS#N+1 is written. The following processing of Write command cannot be performed until DS#N+2 is written. That means that execution of Write command is started after the completion of the backhitch, which is involved after DS#N+2 is written, and DS#N+3 is written as shown in (c).

Writing of the next data (in this case, data of DS#N+3 and thereafter) cannot be started until the backhitch is performed twice. That significantly influences the performance. The embodiment provides a solution to the problem in that the backhitch is involved twice for a command sequence of WriteFM0 and WriteFM1 at the tape drive 10 side so that the backhitch is involved only once for that command sequence. In such a case, it is significant to improve the performance at the tape drive 10 side, as it is uneasy to change the software program at the host 30 side.

Significantly, the embodiment speculatively writes FM corresponding to WriteFM1 command on the assumption that WriteFM1 command is to be issued next, when WriteFM0 command is received. The FM which is speculatively written as such will be called "Speculative FM" below. The embodiment avoids involvement of the backhitch by having the cartridge memory 24 hold that the speculative FM is written, and only updating information of the cartridge memory 24 in response to the subsequent WriteFM1 command. The embodiment is adapted to have the cartridge memory 24 hold that the speculative FM is written for the purpose of distinguishing whether FM left last in the tape 23 is a speculative FM or a general FM in the case where the power source is disconnected after a speculative FM is written and before the next processing is performed. When the speculative FM becomes unnecessary, the embodiment is adapted not to send the speculative FM in response to a command for reading out FM by mistake to the host 30.

Figure 3:
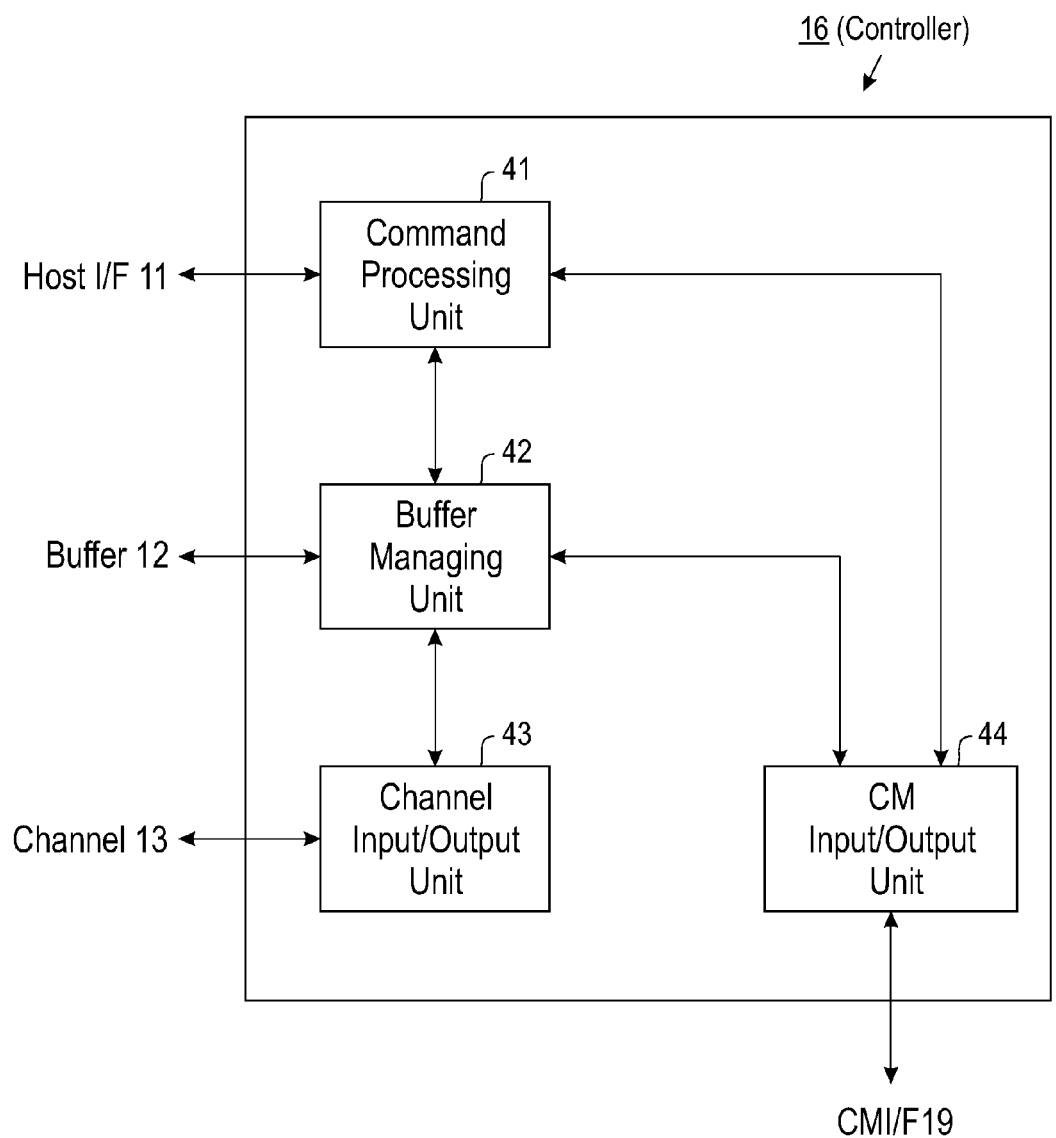
FIG. 3 is a block diagram showing an exemplary functional configuration of the controller in the embodiment of the present invention.
Figure 4A:
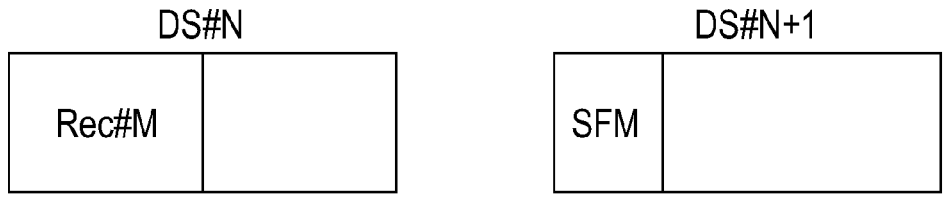
FIG. 4 is a diagram outlining a first exemplary operation of the controller in the embodiment of the present invention.
Figure 4B:
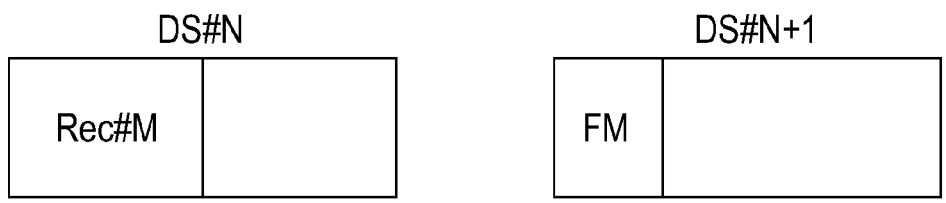
Figure 4C:
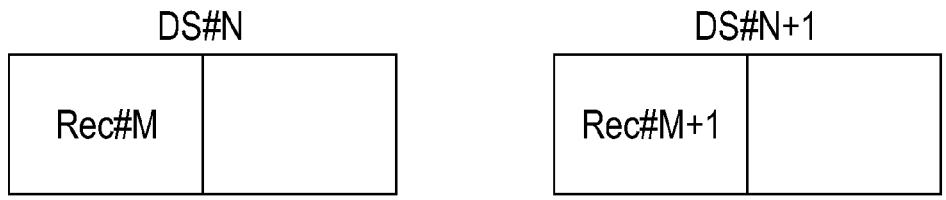
Figure 4D:
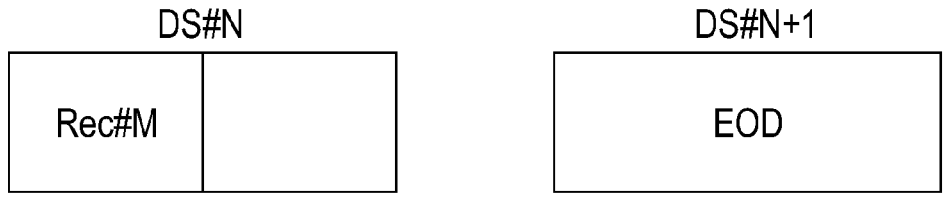

FIG. 3 is a block diagram showing an exemplary functional configuration of the controller 16. As shown in the figure, the controller 16 includes a command processing unit 41, a buffer managing unit 42, a channel input/output unit 43, and a cartridge memory input/output unit (hereinafter, referred to as "CM input/output unit") 44. The command processing unit 41 receives a command from the host I/F 11. Provided as the command here are WriteFM0 command, which is an example of the first command for instructing to forcibly write data in a buffer onto a tape medium; WriteFM1 command, which is an example of the second command for instructing to write delimiter information onto the tape medium; Write command, which is an example of the third command for instructing to store data in a buffer; and Read command, Locate command and Space command which are examples of the fourth command for reading out delimiter information that is written on the tape medium or locating to the delimiter information that is written on the tape medium. In the embodiment, the command processing unit 41 is provided as an example of a receiving unit for receiving the first to the fourth commands.

When the command processing unit 41 receives WriteFM0 command, the buffer managing unit 42 prepares a speculative FM in the buffer 12. When the command processing unit 41 receives WriteFM1 command and if the command does not come immediately after WriteFM0 command, the buffer managing unit 42 prepares FM in the buffer 12. When the command processing unit 41 receives Write command, the buffer managing unit 42 prepares data in the buffer 12. When the command processing unit 41 receives a command other than WriteFM command and Write command and if the command comes immediately after WriteFM0 command, the buffer managing unit 42 prepares EOD (End Of Data) in the buffer 12.

The channel input/output unit 43 outputs data that is read out from the buffer 12 by the buffer managing unit 42 to the channel 13 and stores data that is received from the channel 13 in the buffer 12. Specifically, the channel input/output unit 43 outputs FM, which is an example of delimiter information, a speculative FM, which is an example of speculative delimiter information, and data for overwriting the speculative FM so as to write them onto the tape 23. In the embodiment, the channel input/output unit 43 is provided as an example of the writing unit for writing data in a buffer and speculative delimiter information onto a tape medium or an example of the processing unit for performing processing to disable speculative delimiter information to be dealt as valid delimiter information.

The CM input/output unit 44 checks whether the cartridge memory 24 is accessible or not or whether information indicating that a speculative FM is on the tape 23 (hereinafter, referred to as "speculative FM presence information") is saved in the cartridge memory 24 or not via the CM I/F 19. The CM input/output unit 44 also erases the speculative FM presence information that is saved in the cartridge memory 24. In the embodiment, the CM input/output unit 44 is provided as an example of the recording unit for recording information that indicates that speculative delimiter information is written onto a tape medium on a recording medium or an example of a processing unit for performing processing to enable speculative delimiter information to be dealt as valid delimiter information.

If a speculative FM is written in response to WriteFM0 command but WriteFM 1 command does not come unexpectedly, the operation differs according to whether the speculative FM is physically overwritten or logically overwritten. Here, the operation will be described for respective cases.

FIG. 4 is a diagram schematically showing the content of the data set in this case. "Data set" is also denoted as "DS" in the figure, for convenience. Specifically, the figure shows the content of the data set by focusing on DS#N and DS#N+1. First, at (a), in response to WriteFM0 command, DS#N that includes a record Rec#M which has been received from the host 30 at that moment; and DS#N+1 that only includes a speculative FM are written on the tape 23. In the figure, "SFM" represents a speculative FM. (b) shows the content of DS#N and DS#N+1 in the case where WriteFM1 command comes expectedly. In this case, the speculative FM is validated to be a general FM.

In contrast, (c) and (d) show the content of DS#N and DS#N+1 in the case where WriteFM1 command does not come next unexpectedly. If Write command instructs to write Rec#M+1, DS#N+1 that includes the speculative FM is physically overwritten by DS#N+1 that includes Rec#M+1 as shown in (c). If a command other than Write command comes, DS#N+1 that includes the speculative FM is physically overwritten by DS#N+1 that includes EOD as shown in (d). Here, the term "physical overwrite" means overwriting by writing other data over the position on the tape 23 where the speculative FM is written.

Figure 5:
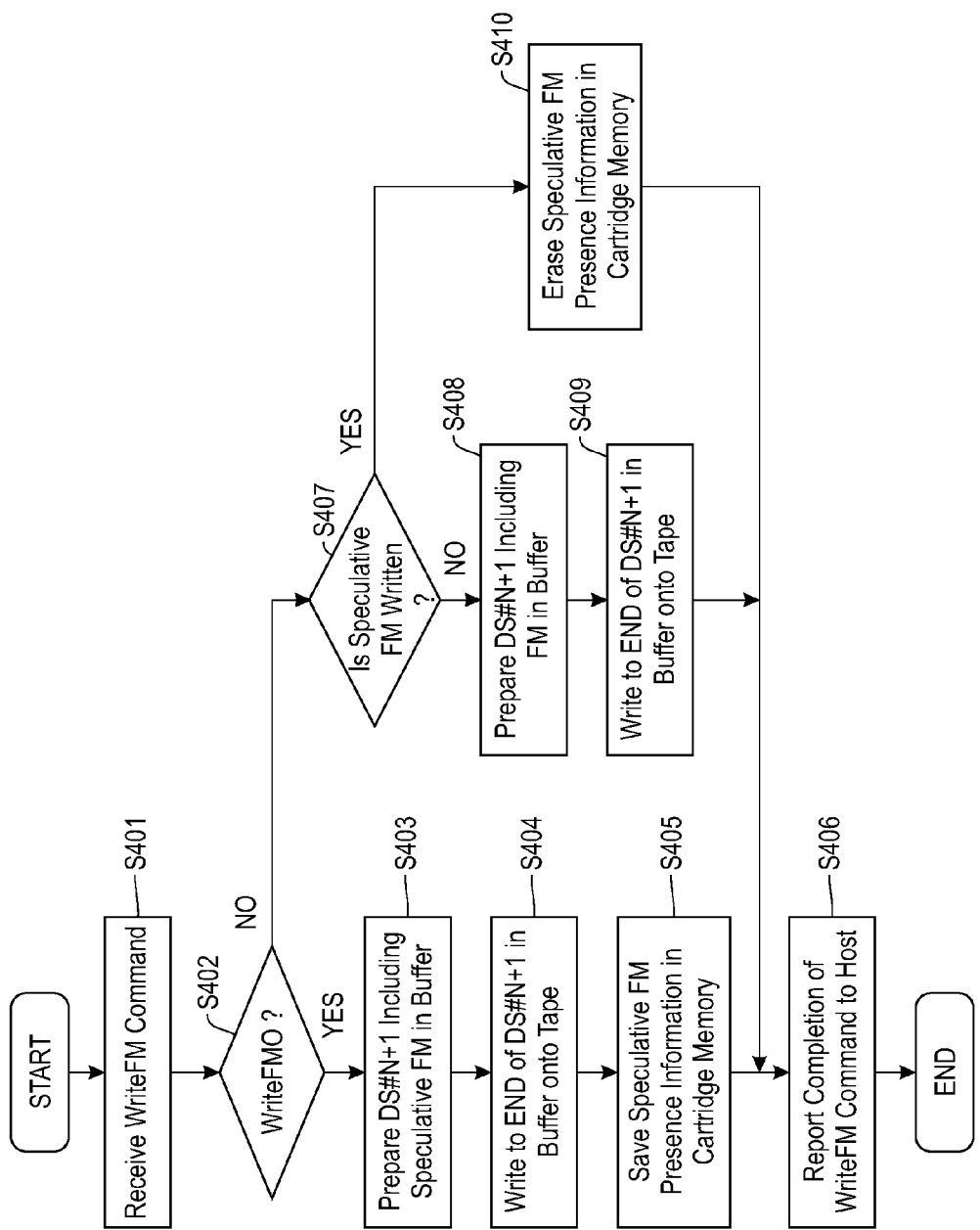
FIG. 5 is a flowchart showing the first exemplary operation of the controller in the embodiment of the present invention when it receives WriteFM command.

The operation performed in the case where WriteFM command is received will be described. FIG. 5 is a flowchart showing an exemplary operation performed by the controller 16 in the case. It is assumed that the buffer 12 stores some data sets up to DS#N and DS#N which includes only the first part of data as shown in FIG. 4 at this moment. In the controller 16, the command processing unit 41 receives WriteFM command from the host I/F 11 at first (step 401), and determines whether that WriteFM command is WriteFM0 command or WriteFM1 command (step 402).

If the command processing unit 41 determines that it is WriteFM0 command, it outputs information indicating as such to the buffer managing unit 42, and the buffer managing unit 42 prepares DS#N+1 which includes a speculative FM in the buffer 12 (step 403). The buffer managing unit 42 passes the data in the buffer 12 to the channel input/output unit 43, and the channel input/output unit 43 outputs the data to the channel 13 (step 404). In this manner, data sets up to DS#N+1 in the buffer 12 are written onto the tape 23 via the channel 13 and the head 14. The buffer managing unit 42 reports that it has written the speculative FM onto the tape 23 to the CM input/output unit 44, and the CM input/output unit 44 outputs information for instructing to save the speculative FM presence information in the cartridge memory 24 to the CMI/F 19 (step 405).

Then, the processed result is returned the command processing unit 41, and the command processing unit 41 reports the completion of WriteFM command (in this case, WriteFM0 command) to the host 30 (step 406). If the command processing unit 41 determines that it is WriteFM1 command at step 402, it reports as such to the CM input/output unit 44, and the CM input/output unit 44 checks whether speculative FM presence information is saved in the cartridge memory 24 or not by using the CMI/F 19 and accordingly, determines whether a speculative FM is present on the tape 23 or not (step 407).

If the CM input/output unit 44 determines that no speculative FM is present on the tape 23, it reports as such to the buffer managing unit 42. In this case, as the previous command is not WriteFM0 command, i.e., this is not the case where WriteFM1 command follows WriteFM0 command, the buffer managing unit 42 performs writing of a general FM. That is, the buffer managing unit 42 prepares DS#N+1 that includes FM in the buffer 12 (step 408). Then, the buffer managing unit 42 passes the data in the buffer 12 to the channel input/output unit 43, and the channel input/output unit 43 outputs the data to the channel 13 (step 409). In this manner, data sets up to DS#N+1 in the buffer 12 are written onto the tape 23 via the channel 13 and the head 14.

Then, the processed result is returned to the command processing unit 41, and the command processing unit 41 reports the completion of WriteFM command (in this case, WriteFM1 command) to the host 30 (step 406). If the CM input/output unit 44 determines that a speculative FM is present on the tape 23 at step 407, which means that the previous command is WriteFM0 command, i.e., this is the case where WriteFM1 command follows WriteFM0 command, the CM input/output unit 44 outputs information for instructing to erase the speculative FM presence information stored in the cartridge memory 24 to the CMI/F 19 (step 410). As the result, the speculative FM presence information in the cartridge memory 24 is erased. Then, the processed result is returned to the command processing unit 41, and the command processing unit 41 reports the completion of WriteFM command (in this case, WriteFM1 command) to the host 30 (step 406).

Figure 6:
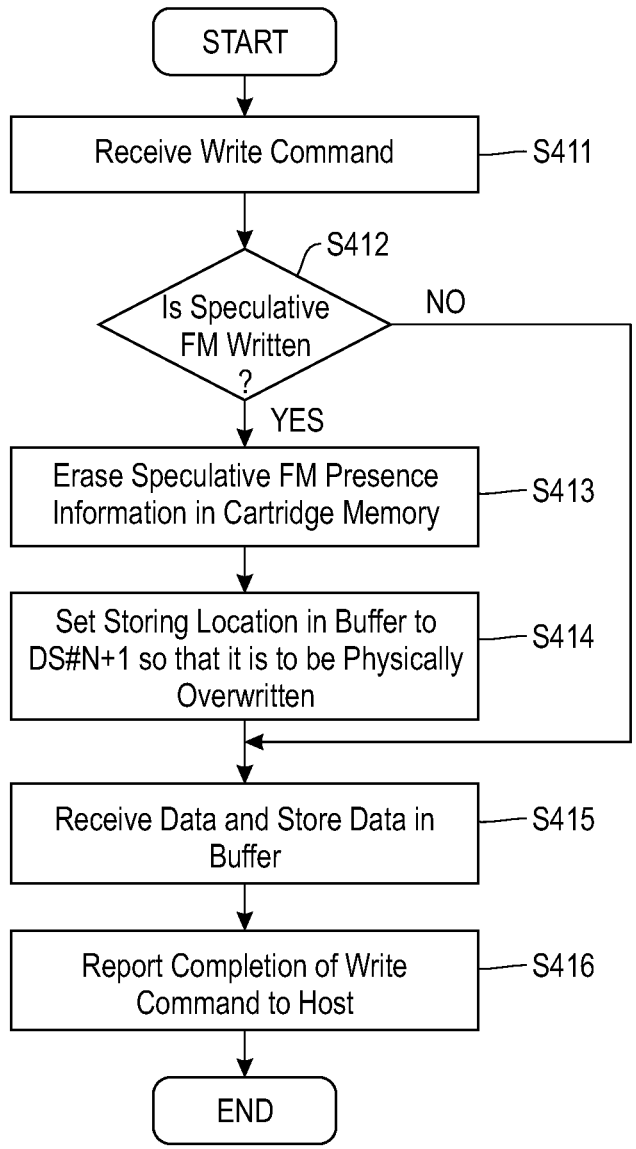
FIG. 6 is a flowchart showing the first exemplary operation of the controller in the embodiment of the present invention when it receives Write command.

FIG. 6 is a flowchart showing an exemplary operation performed by the controller 16 in this case. It is assumed that data up to DS#N+1 is written on the tape 23 at this moment. In the controller 16, the command processing unit 41 receives Write command from the host I/F 11 at first (step 411), and outputs information indicating as such to the buffer managing unit 42 and the CM input/output unit 44. Then, the CM input/output unit 44 checks whether speculative FM presence information is saved in the cartridge memory 24 or not by using the CMI/F 19 and accordingly, determines whether a speculative FM is present on the tape 23 or not (step 412).

If the CM input/output unit 44 determines that a speculative FM is present on the tape 23, it is the case where Write command follows WriteFM0 command although the speculative FM is written onto the tape 23 in expectation of having WriteFM1 command following WriteFM0 command. In this case, the CM input/output unit 44 outputs information for instructing to erase the speculative FM presence information stored in the cartridge memory 24 to the CMI/F 19 (step 413). As the result, the speculative FM presence information in the cartridge memory 24 is erased.

The CM input/output unit 44 also reports that the speculative FM presence information was saved in the cartridge memory 24 to the buffer managing unit 42. In response, the buffer managing unit 42 performs processing to invalidate the speculative FM on the tape 23 and write the next piece of data. Specifically, the buffer managing unit 42 manages to set the storing location for the data in the buffer 12 to DS#N+1 so that DS#N+1 which includes the speculative FM on the tape 23 is physically overwritten by the new DS#N+1 (step 414). If DS#N+1 in the buffer 12 is to be written over the location to physically overwrite DS#N+1 on the tape 23, the management to make it physically overwritten is to match the number of data set on the tape 23 which is to be overwritten and the number of data set in the buffer 12 to overwrite. If DS#N+1 in the buffer 12 is not necessarily to be written over the location to physically overwrite DS#N+1 on the tape 23, information indicating that the data set is to physically overwrite the data set of the same number on the tape 23 may be added to an information table attached to the data set (DSIT: Data Set Information Table).

Then, from the command processing unit 41, the buffer managing unit 42 receives data that is sent with Write command from the host 30 and stores the data in the data set which is set as the storing location in the buffer 12 (step 415). Then, the processed result is returned to the command processing unit 41, and the command processing unit 41 reports the completion of Write command to the host 30 (step 416). In response to the following synchronize command, the speculative FM is physically overwritten by the data. This case can be considered the same as where WriteFM1 command is executed and the speculative FM is overwritten by the next piece of data.

If the CM input/output unit 44 determines that no speculative FM is present on the tape 23 at step 412, it is the case where a general Write command comes instead of Write command which follows WriteFM0 command. In this case, the CM input/output unit 44 reports as such to the buffer managing unit 42. Then, the buffer managing unit 42 receives data that is sent with Write command from the host 30 and stores the data following to the current data in the buffer 12 (step 415). Then, the processed result is returned the command processing unit 41, and the command processing unit 41 reports the completion of Write command to the host 30 (step 416).

Figure 7:
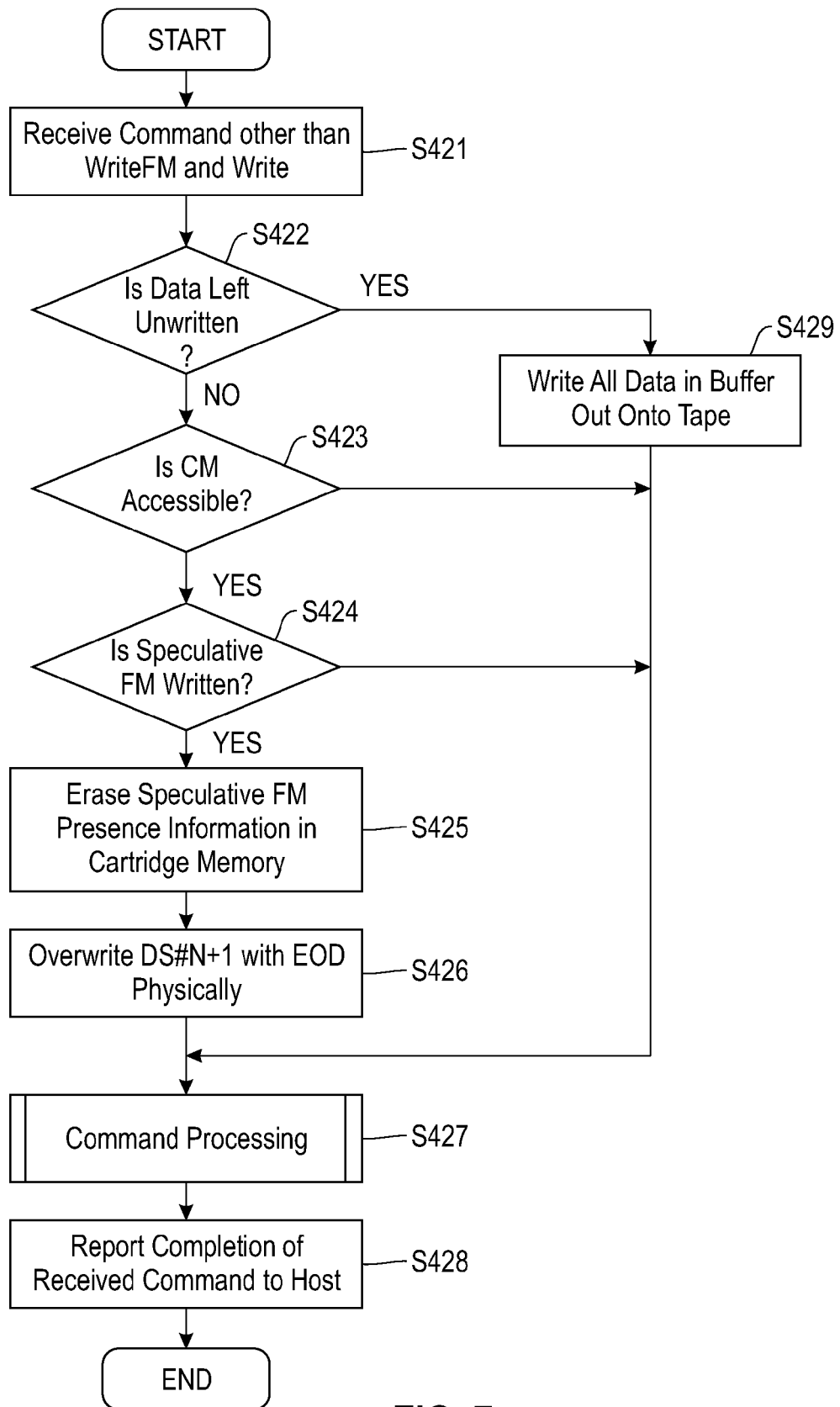
FIG. 7 is a flowchart showing the first exemplary operation of the controller in the embodiment of the present invention when it receives a command other than WriteFM command and Write command.

For the operation, the case where the cartridge memory 24 can be read and the case where the cartridge memory 24 cannot be read are considered. This is because the data written on the tape 23 needs to be correctly read out even if the cartridge memory 24 is physically broken. FIG. 7 is a flowchart showing an exemplary operation performed by the controller 16 in this case. It is assumed that DS#N+1 is the data set that is last written on the tape 23. In the controller 16, the command processing unit 41 receives a command other than WriteFM command and Write command from the host I/F 11 at first (step 421). Read command, Locate command, Space command, Rewind command, Unload command and the like are known as such command.

Then, the command processing unit 41 outputs information indicating that it has received a command to the buffer managing unit 42, and the buffer managing unit 42 determines whether data is left unwritten in the buffer 12 or not (step 422). If the buffer managing unit 42 determines that data is left unwritten in the buffer 12, it writes all the data in the buffer 12 onto the tape 23 (step 429), and the operation returns to step 427. If the buffer managing unit 42 determines that no data is left unwritten in the buffer 12, it outputs information indicating as such to the CM input/output unit 44. Then, the CM input/output unit 44 outputs information for instructing to check whether the cartridge memory 24 is accessible or not to the CMI/F 19 (step 423).

If the CMI/F 19 determines that the cartridge memory 24 is not accessible, the operation jumps to step 427. If the CMI/F 19 determines that the cartridge memory 24 is accessible, the CM input/output unit 44 checks whether speculative FM presence information is saved in the cartridge memory 24 or not by using the CMI/F 19 and accordingly, determines whether a speculative FM is present on the tape 23 or not (step 424). If no speculative FM is present on the tape 23, the operation jumps to step 427. If a speculative FM is present on the tape 23, the CM input/output unit 44 outputs information for instructing to erase the speculative FM presence information stored in the cartridge memory 24 to the CMI/F 19 (step 425). As the result, the speculative FM presence information in the cartridge memory 24 is erased.

The CM input/output unit 44 also reports that the speculative FM presence information was saved in the cartridge memory 24 to the buffer managing unit 42. As no speculative FM should be present on the tape 23 at the moment when the series of writing processes finished, the buffer managing unit 42 performs processing to invalidate the speculative FM on the tape 23 and write EOD in response to the report. Specifically, the buffer managing unit 42 manages to set the storing location for EOD in the buffer 12 to DS#N+1 so that DS#N+1 which includes the speculative FM on the tape 23 is physically overwritten by the new DS#N+1 (step 426). The same method as that has been described with respect to step 414 may be applied to the method here for managing to make it physically overwritten.

Then, the command processing to be described later is performed according to a command that is received by the command processing unit 41 (step 427). When the command processing ends, the command processing unit 41 reports the completion of the command to the host 30 (step 428).

Figure 8:
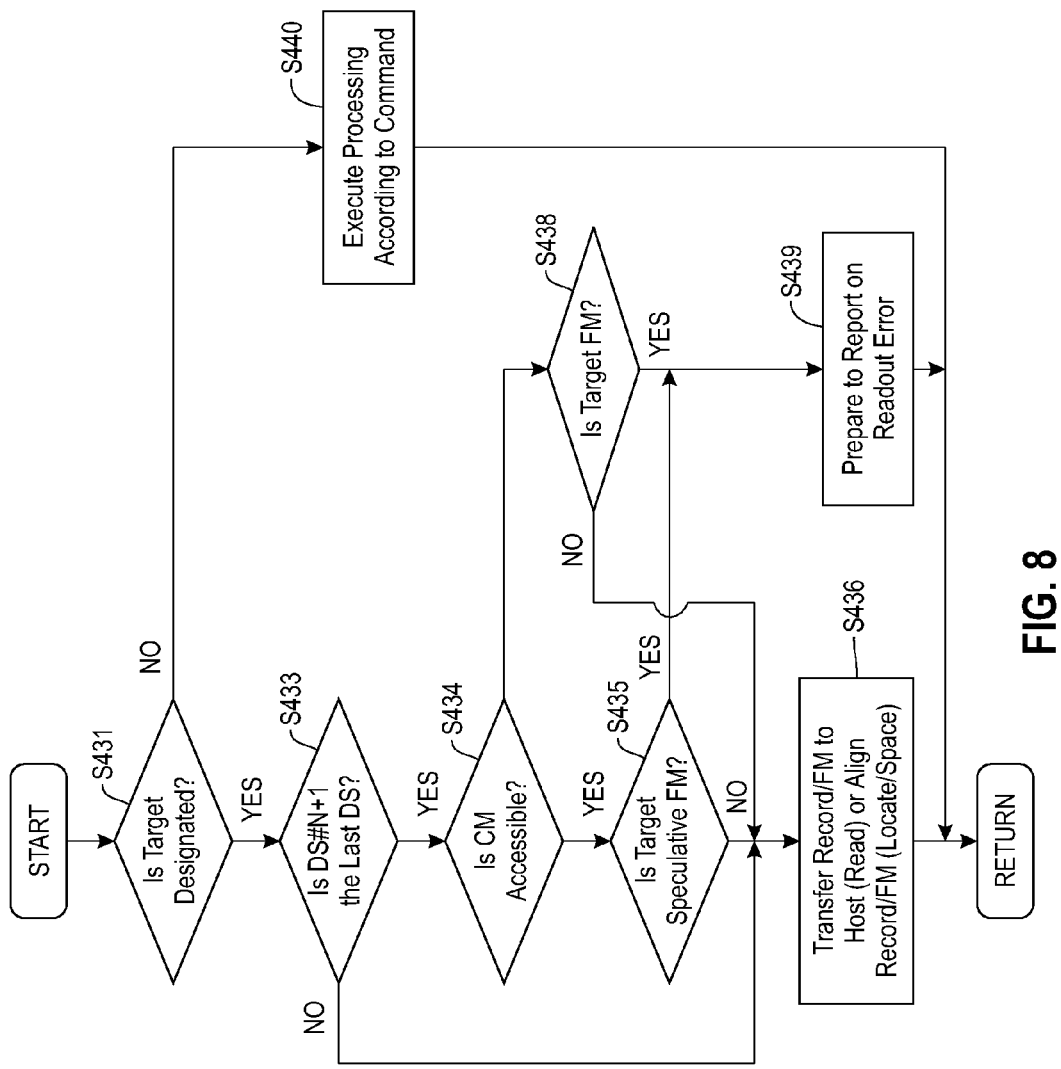
FIG. 8 is a flowchart showing the first exemplary operation of the controller in the embodiment of the present invention when it receives a command other than WriteFM command and Write command.
Figure 9A:
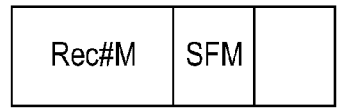
FIG. 9 is a diagram outlining a second exemplary operation of the controller in the embodiment of the present invention.
Figure 9B:
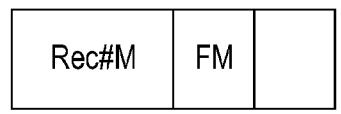
Figure 9C:
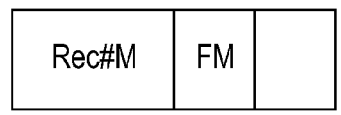
Figure 9C:
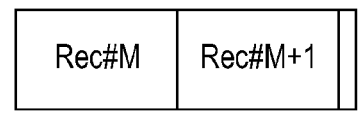
Figure 9D:
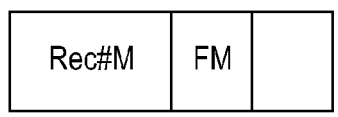
Figure 9D:
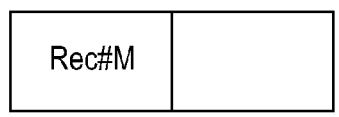

FIG. 8 is a flowchart showing an exemplary operation performed by the controller 16 in command processing. In the controller 16, the command processing unit 41 determines whether the command to be processed has target designation or not (step 431). The term "target" here means a record or FM to be read out, which is designated by Read command, and a record or FM to be aligned, which is designated by Locate command or Space command.

According to the determination, if it is not a command with target designation, for example, if it is Unload command or the like, processing according to the command is executed (step 440), and the operation returns to the flowchart shown in FIG. 7. If it is a command with target designation, for example, if it is Read command, Locate command, Space command or the like, the command processing unit 41 outputs the command and the target to the channel input/output unit 43, and the channel input/output unit 43 attempts to read the data set which includes the target and the following data set, and returns the result of whether it can read them or not to the command processing unit 41. Based on the result, the command processing unit 41 determines whether the data set with the target is the last data set on the tape 23 or not (step 433). In the figure, a data set including a target is denoted as DS#N.

If the command processing unit 41 determines that it is not the last data set, it transfers a record or FM which is obtained by the channel input/output unit 43 to the host 30, in response to Read command. In response to Locate command or Space command, the buffer managing unit 42 performs alignment to the designated record or the designated FM (step 436). If the command processing unit 41 determines that it is the last data set, it outputs information indicating as such to the CM input/output unit 44. Then, the CM input/output unit 44 outputs information for instructing to check whether the cartridge memory 24 is accessible or not to the CMI/F 19 (step 434).

First, the case where it is determined that the cartridge memory 24 is accessible at step 434 will be described. In this case, the command processing unit 41 determines whether the target is a speculative FM or not (step 435). The determination here can be performed in the manner below. Specifically, the command processing unit 41 determines whether the target is the last block in the data set (record or FM) or not. Then, the CM input/output unit 44 checks whether speculative FM presence information is saved in the cartridge memory 24 or not by using the CMI/F 19 and accordingly, determines whether the speculative FM is present on the tape 23 or not. According to the determination, if the target is the last block in the data set and the speculative FM is present on the tape 23, it means that the speculative FM is designated as a target.

Except for the case where write processing is not successfully finished after a speculative FM is written due to a power source failure or the like, speculative FM presence information does not left in the cartridge memory 24 at this moment.

Therefore, if DS#N and DS#N+1 are dealt according to a rule of physical overwriting, consistent data can be transferred to the host 30. Specifically, if the CM input/output unit 44 determines that the target is not a speculative FM, the command processing unit 41 transfers a record or FM which is obtained by the channel input/output unit 43 to the host 30, in response to Read command. In response to Locate command or Space command, the buffer managing unit 42 performs alignment to the designated record or the designated FM (step 436).

If a speculative FM has been written on the tape 23 in response to WriteFM0 command but no processing thereafter was able to be performed due to a power source failure or the like of the drive, speculative FM presence information may be still left in the cartridge memory 24. In such a case, the last written speculative FM on the tape 23 will be dealt as it has not been existed. Specifically, if the CM input/output unit 44 determines that the target is a speculative FM, the command processing unit 41 prepares to report on a readout error (step 439). This readout error is reported to the host 30 at step 428 shown in FIG. 7. Next, the case where it is determined that the cartridge memory 24 is not accessible at step 434 will be described. As the case where the cartridge memory 24 is invalid, the case where the cartridge memory 24 is physically unavailable can be considered. Even in such a case, data on the tape 23 needs to be correctly transferred to the host 30 as much as possible.

Here, the case where the next data set cannot be read, i.e., where the data set that includes the target is the last data set on the tape 23 will be considered. In such a case, as the FM which can be read last from the tape 23 gives uncertain information (it might be a speculative FM), the FM is not transferred to the host 30. Specifically, first, the command processing unit 41 determines whether the target is FM or not (step 438). If the command processing unit 41 determines that the target is FM, it prepares to report on a readout error (step 439). This readout error is reported to the host 30 at step 428 shown in FIG. 7. If the command processing unit 41 determines that the target is not FM, it transfers a record which is obtained by the channel input/output unit 43 to the host 30, in response to Read command. In response to Locate command or Space command, the buffer managing unit 42 performs alignment to the designated record (step 436).

In the case where the next data set can be read, i.e., where the data set that includes the target is not the last data set on the tape 23, if DS#N and DS#N+1 are dealt according to a rule of physical overwriting, consistent data can be transferred to the host 30. In such a case, no speculative FM presence information is present on the cartridge memory 24. This is because, if writing of the next data set is successfully finished, the speculative FM can be a valid FM or physically overwritten by the next piece of data. In that case, the determination at step 433 is "No".

FIG. 9 is a diagram schematically showing the content of the data set in this case. "Data set" is also denoted as "DS" in the figure, for convenience. Specifically, the figure shows the content of the data set by focusing on DS#N, and DS#N+1 if required. First, at (a), in response to WriteFM0 command, DS#N that includes a record Rec#M and a speculative FM which have been received from the host 30 at that moment is written on the tape 23. In the figure, "SFM" represents a speculative FM.

(b) shows the content of DS#N in the case where WriteFM1 command comes expectedly. In this case, the speculative FM is validated to be a general FM. In contrast, (c) and (d) show the content of DS#N and DS#N+1 in the case where WriteFM1 command does not come next unexpectedly. If Write command instructs to write Rec#M+1, DS#N that includes Rec#M and the speculative FM is logically overwritten by DS#N+1 that includes Rec#M and Rec#M+1 as shown in (c). If a command other than Write command comes, DS#N that includes Rec#M and the speculative FM is logically overwritten by DS#N+1 that includes Rec#M and EOD is written after that as shown in (d). Here, the term "logical overwrite" means overwriting by writing other data over a position different from the position on the tape 23 where the speculative FM is written and also by writing information indicating that the speculative FM is invalid onto the tape 23.

Figure 10:
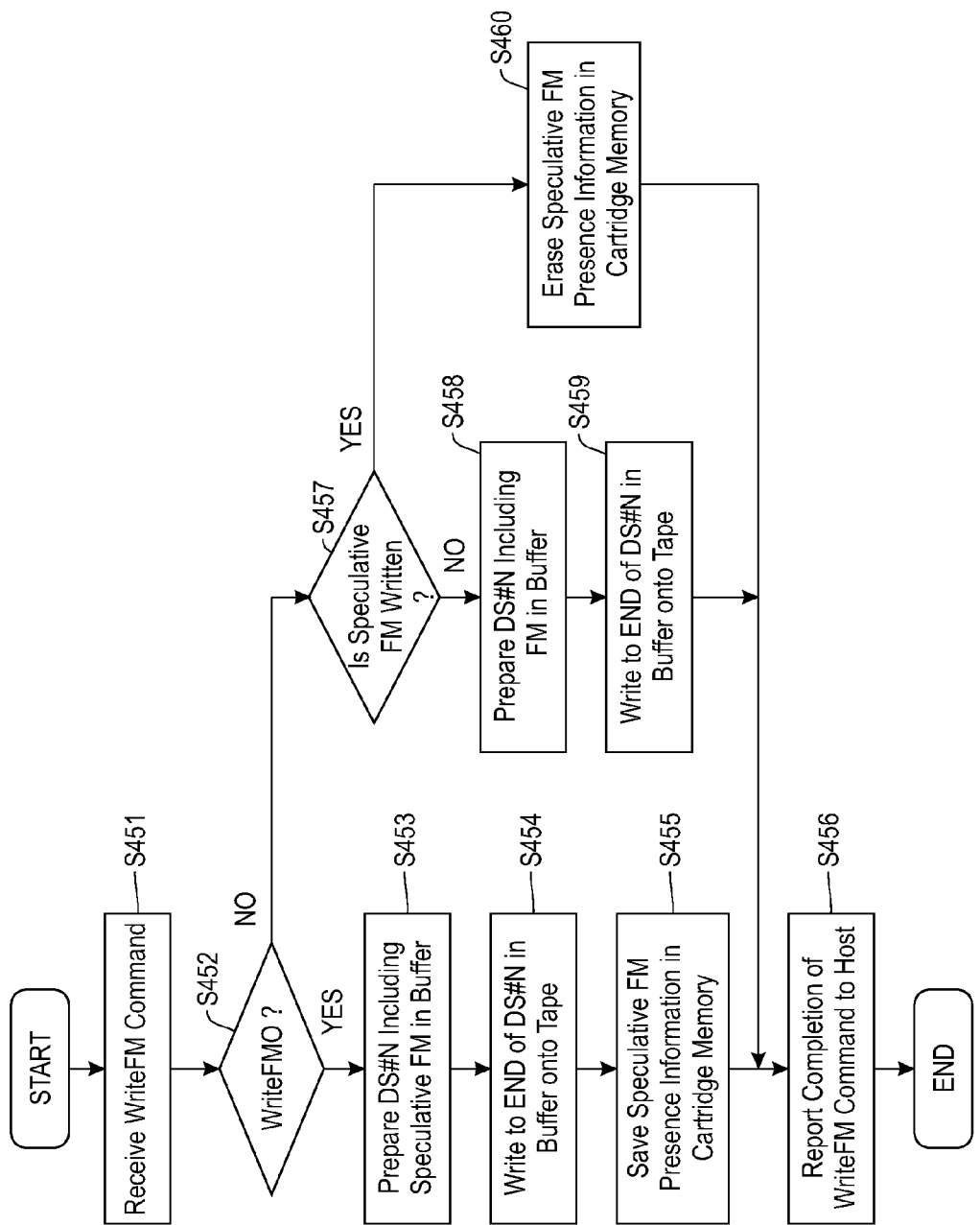
FIG. 10 is a flowchart showing the second exemplary operation of the controller in the embodiment of the present invention when it receives WriteFM command.

FIG. 10 is a flowchart showing an exemplary operation performed by the controller 16 in the case. It is assumed that the buffer 12 stores some data sets up to DS#N and DS#N which includes only the first part of data as shown in FIG. 9 at this moment. In the controller 16, the command processing unit 41 receives WriteFM command from the host I/F 11 at first (step 451), and determines whether that WriteFM command is WriteFM0 command or WriteFM1 command (step 452).

If the command processing unit 41 determines that it is WriteFM0 command, it outputs information indicating as such to the buffer managing unit 42, and the buffer managing unit 42 prepares DS#N which includes a speculative FM in the buffer 12 (step 453). The buffer managing unit 42 passes the data in the buffer 12 to the channel input/output unit 43, and the channel input/output unit 43 outputs the data to the channel 13 (step 454). In this manner, data sets up to DS#N in the buffer 12 are written onto the tape 23 via the channel 13 and the head 14.

The buffer managing unit 42 reports that it has written the speculative FM onto the tape 23 to the CM input/output unit 44, and the CM input/output unit 44 outputs information for instructing to save the speculative FM presence information in the cartridge memory 24 to the CMI/F 19 (step 455). Then, the processed result is returned to the command processing unit 41, and the command processing unit 41 reports the completion of WriteFM command (in this case, WriteFM0 command) to the host 30 (step 456). If the command processing unit 41 determines that it is WriteFM1 command at step 452, it reports as such to the CM input/output unit 44, and the CM input/output unit 44 checks whether speculative FM presence information is saved in the cartridge memory 24 or not by using the CMI/F 19 and accordingly, determines whether a speculative FM is present on the tape 23 or not (step 457).

If the CM input/output unit 44 determines that no speculative FM is present on the tape 23, it reports as such to the buffer managing unit 42. In this case, as the previous command is not WriteFM0 command, i.e., this is not the case where WriteFM1 command follows WriteFM0 command; the buffer managing unit 42 performs writing of a general FM. That is, the buffer managing unit 42 prepares DS#N that includes FM in the buffer 12 at first (step 458). Then, the buffer managing unit 42 passes the data in the buffer 12 to the channel input/output unit 43, and the channel input/output unit 43 outputs the data to the channel 13 (step 459). In this manner, data sets up to DS#N in the buffer 12 are written onto the tape 23 via the channel 13 and the head 14.

Then, the processed result is returned to the command processing unit 41, and the command processing unit 41 reports the completion of WriteFM command (in this case, WriteFM1 command) to the host 30 (step 456). If the CM input/output unit 44 determines that a speculative FM is present on the tape 23 at step 457, which means that the previous command is WriteFM0 command, i.e., this is the case where WriteFM1 command follows WriteFM0 command, the CM input/output unit 44 outputs information for instructing to erase the speculative FM presence information stored in the cartridge memory 24 to the CMI/F 19 (step 460). As the result, the speculative FM presence information in the cartridge memory 24 is erased. Then, the processed result is returned to the command processing unit 41, and the command processing unit 41 reports the completion of WriteFM command (in this case, WriteFM1 command) to the host 30 (step 456).

Figure 11:
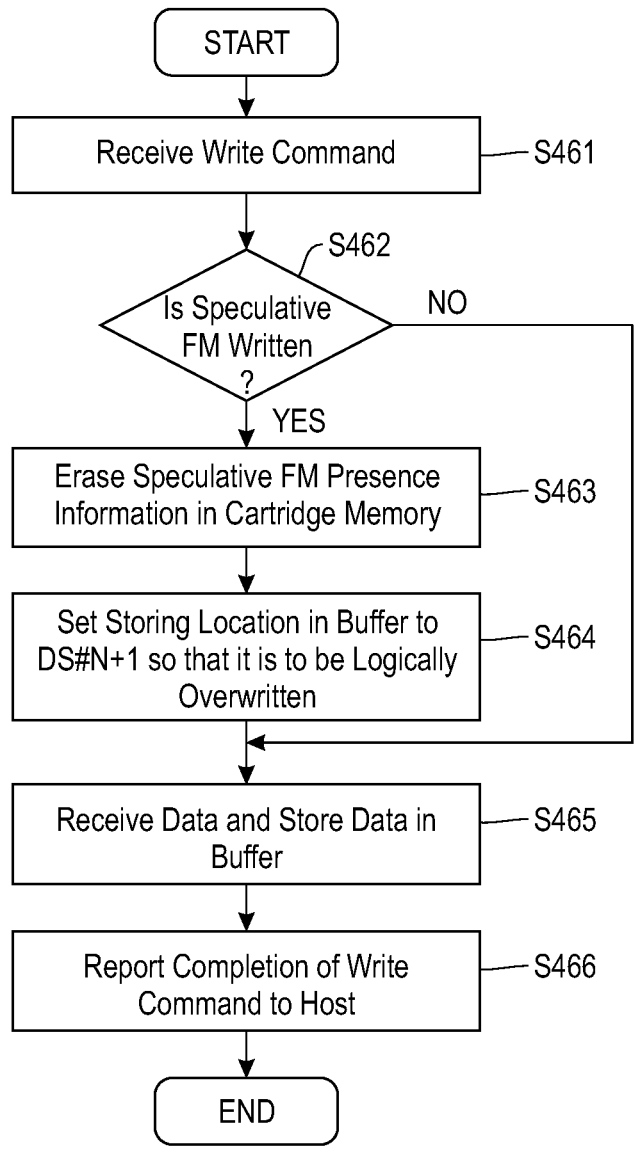
FIG. 11 is a flowchart showing the second exemplary operation of the controller in the embodiment of the present invention when it receives Write command.

FIG. 11 is a flowchart showing an exemplary operation performed by the controller 16 in this case. It is assumed that data up to DS#N is written on the tape 23 at this moment. In the controller 16, the command processing unit 41 receives Write command from the host I/F 11 at first (step 461), and outputs information indicating as such to the buffer managing unit 42 and the CM input/output unit 44. Then, the CM input/output unit 44 checks whether speculative FM presence information is saved in the cartridge memory 24 or not by using the CMI/F 19 and accordingly, determines whether a speculative FM is present on the tape 23 or not (step 462).

If the CM input/output unit 44 determines that a speculative FM is present on the tape 23, it is the case where Write command follows WriteFM0 command although the speculative FM is written onto the tape 23 in expectation of having WriteFM1 command following WriteFM0 command. In this case, the CM input/output unit 44 outputs information for instructing to erase the speculative FM presence information stored in the cartridge memory 24 to the CMI/F 19 (step 463). As the result, the speculative FM presence information in the cartridge memory 24 is erased.

The CM input/output unit 44 also reports that the speculative FM presence information has been saved in the cartridge memory 24 to the buffer managing unit 42. In response, the buffer managing unit 42 performs processing to invalidate the speculative FM on the tape 23 and write the next piece of data. Specifically, the buffer managing unit 42 manages to set the storing location for the data in the buffer 12 to DS#N+1 so that DS#N which includes the speculative FM on the tape 23 is logically overwritten by the new DS#N+1 (step 464). For example, information indicating that DS#N is invalid may be added to an information table attached to DS#N+1 (DSIT), indicating that DS#N+1 substitutes for DS#N.

Then, from the command processing unit 41, the buffer managing unit 42 receives data that is sent with Write command from the host 30 and stores the data in the data set which is set as the storing location in the buffer 12 (step 465). Then, the processed result is returned the command processing unit 41, and the command processing unit 41 reports the completion of Write command to the host 30 (step 466).

In response to the following synchronize command, the speculative FM is logically overwritten by the data. This case can be considered the same as where WriteFM1 command is executed and the speculative FM is logically overwritten by the next piece of data. If the CM input/output unit 44 determines that no speculative FM is present on the tape 23 at step 462, it is the case where a general Write command comes instead of Write command which follows WriteFM0 command. In this case, the CM input/output unit 44 reports as such to the buffer managing unit 42. Then, the buffer managing unit 42 receives data that is sent with Write command from the host 30 and stores the data following to the current data in the buffer 12 (step 465). Then, the processed result is returned the command processing unit 41, and the command processing unit 41 reports the completion of Write command to the host 30 (step 466).

Next, the operation performed in the case where a command other than WriteFM command and Write command is received will be described. For the operation, the case where the cartridge memory 24 can be read and the case where the cartridge memory 24 cannot be read are considered. This is because the data written on the tape 23 needs to be correctly read out even if the cartridge memory 24 is physically broken.

Figure 12:
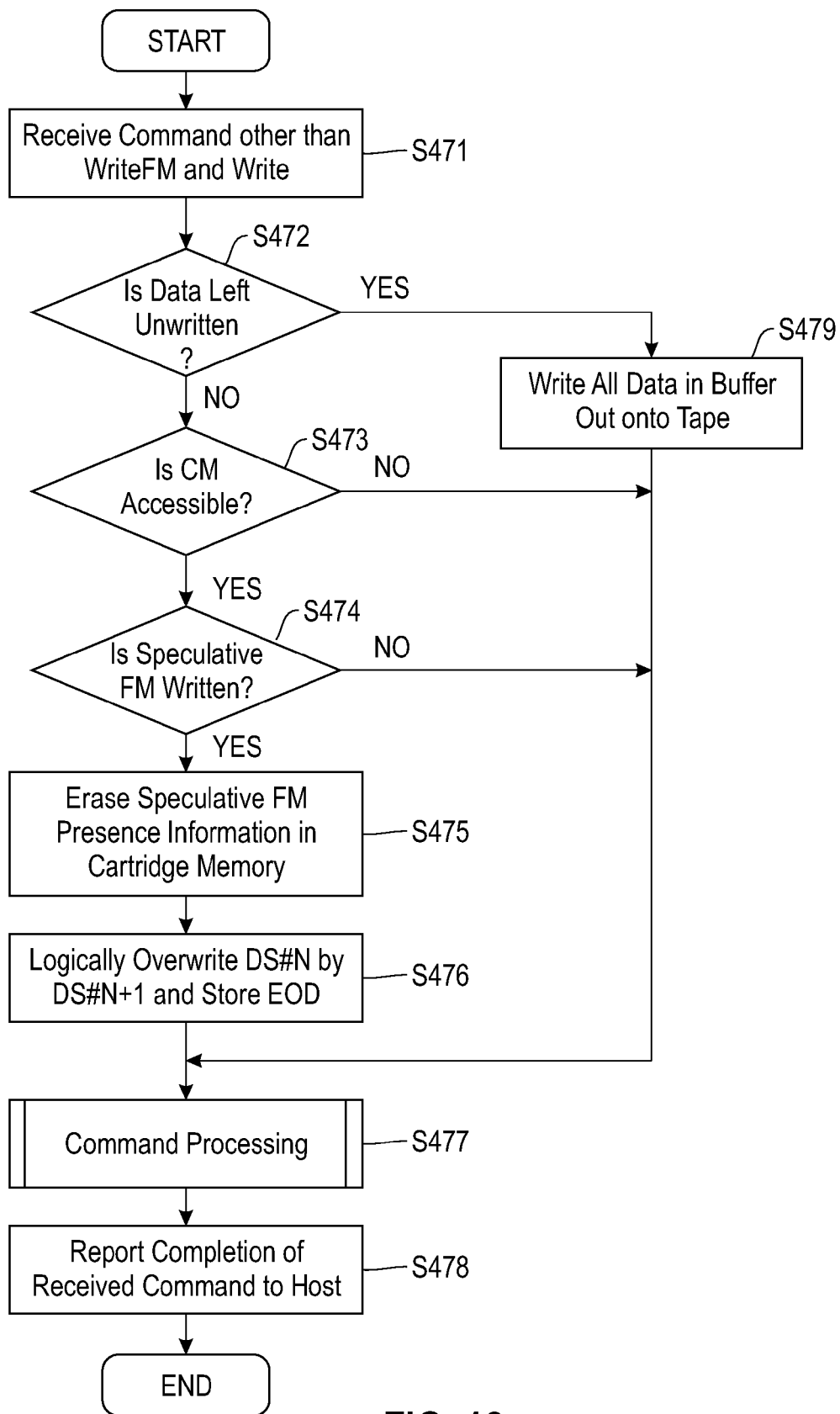
FIG. 12 is a flowchart showing the second exemplary operation of the controller in the embodiment of the present invention when it receives a command other than WriteFM command and Write command.

FIG. 12 is a flowchart showing an exemplary operation performed by the controller 16 in this case. It is assumed that DS#N is the data set that is last written on the tape 23. In the controller 16, the command processing unit 41 receives a command other than WriteFM command and Write command from the host I/F 11 at first (step 471). Read command, Locate command, Space command, Rewind command, Unload command and the like are known as such command. Then, the command processing unit 41 outputs information indicating that it has received a command to the buffer managing unit 42, and the buffer managing unit 42 determines whether data is left unwritten in the buffer 12 or not (step 472).

If the buffer managing unit 42 determines that data is left unwritten in the buffer 12, it writes all the data in the buffer 12 onto the tape 23 (step 479), and the operation returns to step 477. If the buffer managing unit 42 determines that no data is left unwritten in the buffer 12, it outputs information indicating as such to the CM input/output unit 44. Then, the CM input/output unit 44 outputs information for instructing to check whether the cartridge memory 24 is accessible or not to the CMI/F 19 (step 473).

If the CMI/F 19 determines that the cartridge memory 24 is not accessible, the operation jumps to step 477. If the CMI/F 19 determines that the cartridge memory 24 is accessible, the CM input/output unit 44 checks whether speculative FM presence information is saved in the cartridge memory 24 or not by using the CMI/F 19 and accordingly, determines whether a speculative FM is present on the tape 23 or not (step 474). If no speculative FM is present on the tape 23, the operation jumps to step 477. If a speculative FM is present on the tape 23, the CM input/output unit 44 outputs information for instructing to erase the speculative FM presence information stored in the cartridge memory 24 to the CMI/F 19 (step 475). As the result, the speculative FM presence information in the cartridge memory 24 is erased.

The CM input/output unit 44 also reports that the speculative FM presence information has been saved in the cartridge memory 24 to the buffer managing unit 42. As no speculative FM should be present on the tape 23 at the moment when the series of writing processes finished, the buffer managing unit 42 performs processing to invalidate the speculative FM on the tape 23 and write EOD in response to the report. Specifically, the buffer managing unit 42 manages to set the storing location for the data in the buffer 12 to DS#N+1 so that DS#N which includes the speculative FM on the tape 23 is logically overwritten by the new DS#N+1, and also stores EOD in the next data set (step 476). The same method as that has been described with respect to step 464 may be applied to the method here for managing to make it logically overwritten.

Then, the command processing to be described later is performed according to a command that is received by the command processing unit 41 (step 477). When the command processing ends, the command processing unit 41 reports the completion of the command to the host 30 (step 478).

Figure 13:
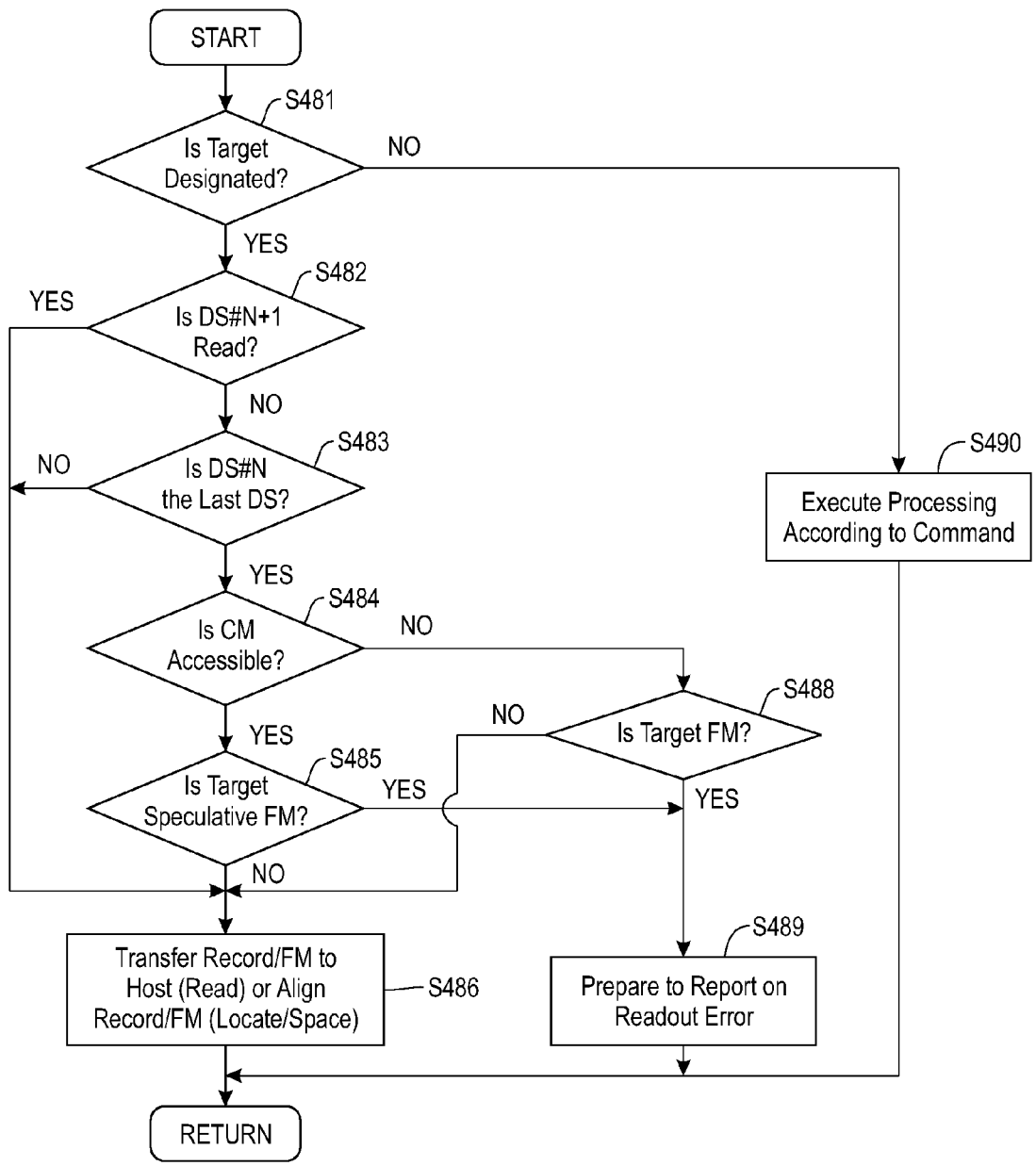
FIG. 13 is a flowchart showing the second exemplary operation of the controller in the embodiment of the present invention when it receives a command other than WriteFM command and Write command.

Next, the operation of the command processing performed at step 477 shown in FIG. 12 will be described. FIG. 13 is a flowchart showing an exemplary operation performed by the controller 16 in command processing. In the controller 16, the command processing unit 41 determines whether the command to be processed has target designation or not (step 481). The term "target" here means a record or FM to be read out, which is designated by Read command, and a record or FM to be aligned, which is designated by Locate command or Space command.

According to the determination, if it is not a command with target designation, for example, if it is Unload command or the like, processing according to the command is executed (step 490), and the operation returns to the flowchart shown in FIG. 12. If it is a command with target designation, for example, if it is Read command, Locate command, Space command or the like, the command processing unit 41 outputs the command and the target to the channel input/output unit 43, and the channel input/output unit 43 attempts to read the data set which includes the target and the following data set, and returns the result of whether it can read them or not to the command processing unit 41. Based on the result, the command processing unit 41 determines whether the data set following the data set with a target can be read or not (step 482). In the figure, a data set with a target is denoted as DS#N.

If the command processing unit 41 determines that the next data set can be read, it transfers a record or FM which is obtained by the channel input/output unit 43 to the host 30, in response to Read command. In response to Locate command or Space command, the buffer managing unit 42 performs alignment to the designated record or the designated FM (step 486). If the command processing unit 41 determines that the next data set cannot be read, it determines whether the data set with the target is the last data set on the tape 23 or not (step 483). If the command processing unit 41 determines that it is not the last data set, it transfers a record or FM which is obtained by the channel input/output unit 43 to the host 30, in response to Read command. In response to Locate command or Space command, the buffer managing unit 42 performs alignment to the designated record or the designated FM (step 486).

If the command processing unit 41 determines that it is the last data set, it outputs information indicating as such to the CM input/output unit 44. Then, the CM input/output unit 44 outputs information for instructing to check whether the cartridge memory 24 is accessible or not to the CMI/F 19 (step 484).

First, the case where it is determined that the cartridge memory 24 is accessible at step 484 will be described. In this case, the command processing unit 41 determines whether the target is a speculative FM or not (step 485). The determination here can be performed in the manner below. Specifically, the command processing unit 41 determines whether the target is the last block in the data set (record or FM) or not at first. Then, the CM input/output unit 44 checks whether speculative FM presence information is saved in the cartridge memory 24 or not by using the CMI/F 19 and accordingly, determines whether the speculative FM is present on the tape 23 or not. According to the determination, if the target is the last block in the data set and the speculative FM is present on the tape 23, it means that the speculative FM is designated as a target.

Except for the case where write processing is not successfully finished after a speculative FM is written due to a power source failure or the like, speculative FM presence information does not left in the cartridge memory 24 at this moment. Therefore, if DS#N and DS#N+1 are dealt according to a rule of logical overwriting, consistent data can be transferred to the host 30. Specifically, if the CM input/output unit 44 determines that the target is not a speculative FM, the command processing unit 41 transfers a record or FM which is obtained by the channel input/output unit 43 to the host 30, in response to Read command. In response to Locate command or Space command, the buffer managing unit 42 performs alignment to the designated record or the designated FM (step 486).

If a speculative FM has been written on the tape 23 in response to WriteFM0 command but no processing thereafter is able to be performed due to a power source failure or the like of the drive, speculative FM presence information may be still left in the cartridge memory 24. In such a case, the last written speculative FM on the tape 23 will be dealt as it has not been existed. Specifically, if the CM input/output unit 44 determines that the target is a speculative FM, the command processing unit 41 prepares to report on a readout error (step 489). This readout error is reported to the host 30 at step 478 shown in FIG. 12.

Next, the case where it is determined that the cartridge memory 24 is not accessible at step 484 will be described. As the case where the cartridge memory 24 is invalid, the case where the cartridge memory 24 is physically unavailable can be considered. Even in such a case, data on the tape 23 needs to be correctly transferred to the host 30 as much as possible.

Here, the case where the next data set cannot be read, i.e., where the data set that includes the target is the last data set on the tape 23 will be considered. In such a case, as the FM which can be read last from the tape 23 gives uncertain information (it might be a speculative FM), the FM is not transferred to the host 30. Specifically, first, the command processing unit 41 determines whether the target is FM or not (step 488). If the command processing unit 41 determines that the target is FM, it prepares to report on a readout error (step 489). This readout error is reported to the host 30 at step 478 shown in FIG. 12. If the command processing unit 41 determines that the target is not FM, it transfers a record which is obtained by the channel input/output unit 43 to the host 30, in response to Read command. In response to Locate command or Space command, the buffer managing unit 42 performs alignment to the designated record (step 486).

In the case where the next data set can be read, i.e., where the data set that includes the target is not the last data set on the tape 23, if DS#N and DS#N+1 are dealt according to a rule of logical overwriting, consistent data can be transferred to the host 30. In such a case, no speculative FM presence information is present on the cartridge memory 24. This is because, if writing of the next data set is successfully finished, the speculative FM can be a valid FM or physically overwritten by the next piece of data. In that case, the determination at step 483 is "No".

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for writing data in a buffer to a tape medium, comprising:
    a receiving unit for receiving a first command and a second command from a host, the first command instructing data in the buffer to be forcibly written to the tape medium and the second command instructing delimiter information to be forcibly written to the tape medium;
    a writing unit for writing the data in the buffer and speculative delimiter information to the tape medium in response to receipt of the first command;
    a processing unit for processing the speculative delimiter information as valid delimiter information when the receiving unit receives the second command after the first command;

a recording unit for recording information in a recording medium, the information indicating that the speculative delimiter information is written to the tape medium by the writing unit; and the processing unit processing the speculative delimiter information as valid delimiter information by erasing the information recorded in the recording medium, wherein the processing unit is configured to disable the speculative delimiter information as valid delimiter information when the receiving unit receives a third command after the first command.

2. The apparatus of claim 1, wherein the speculative delimiter information is overwritten on the tape if a third command is received after the first command and before the second command.

3. The apparatus of claim 1, wherein the recording medium comprises memory coupled to a tape cartridge, the tape cartridge containing the tape medium.

4. The apparatus of claim 1, further comprising:
the third command instructing data to be stored in the buffer; and
the processing unit storing data in the buffer so that the speculative delimiter information is overwritten by the data stored in the buffer.

5. The apparatus of claim 4, wherein a location on the tape medium where the speculative delimiter information is written is physically overwritten.

6. The apparatus of claim 1, wherein the data in the buffer is written to a location on the tape medium different from a location where the speculative delimiter information is written, wherein information indicating that the speculative delimiter information is invalid is written to the tape medium.

7. The apparatus of claim 1,
wherein the processing unit is configured to store end information in the buffer so that the speculative delimiter information is overwritten by the end information.

8. The apparatus of claim 1,
wherein the receiving unit is configured to receive a fourth command, the fourth command comprising instructions for at least one of reading out delimiter information stored on the tape medium and locating the delimiter information.

9. The apparatus of claim 1,
the third command instructing data to be stored in the buffer, the processing unit storing data in the buffer so that the speculative delimiter information is overwritten by the data stored in the buffer,
wherein the data in the buffer is written to a location on the tape medium different from a location where the speculative delimiter information is written, wherein information indicating that the speculative delimiter information is invalid is written to the tape medium,
wherein the receiving unit is configured to receive a fourth command, the fourth command comprising instructions for at least one of reading out delimiter information stored on the tape medium and locating the delimiter information.

10. A method, comprising:
receiving a first command;
writing data in a buffer to a tape medium, the first command forcibly writing data in the buffer to the tape medium upon receipt thereof;
writing speculative delimiter information to the tape medium when the first command is received; and
processing the speculative delimiter information as valid delimiter information when a second command is received after the first command, the second command instructing writing of the write delimiter information to the tape medium.

11. The method of claim 10, further comprising:
recording information in a recording medium, the information indicating that the speculative delimiter information is written to the tape medium; and
processing the speculative delimiter information as valid delimiter information by erasing the information recorded in the recording medium.

12. The method of claim 10, further comprising:
receiving a third command; and
disabling the speculative delimiter information as valid delimiter information upon receipt of the third command after the first command.

13. The method of claim 12, further comprising:
the third command instructing data to be stored in the buffer; and
storing data in the buffer so that the speculative delimiter information is overwritten by the data stored in the buffer.

14. The method of claim 10, further comprising:
recording information in a recording medium, the information indicating that the speculative delimiter information is written to the tape medium;
processing the speculative delimiter information as valid delimiter information by erasing the information recorded in the recording medium;
receiving a third command, the third command instructing data to be stored in the buffer;
disabling the speculative delimiter information as valid delimiter information when the receiving unit receives a third command after the first command.

15. The method of claim 10, wherein the speculative delimiter information is overwritten on the tape if a third command is received after the first command and before the second command.

16. A computer program product comprising:
a non-transitory machine-readable storage medium having computer usable program code embodied therewith, the computer usable program code comprising:
computer usable program code configured to write data in a buffer to a tape medium, the computer usable program code comprising:
computer usable program code configured to receive a first command and a second command from a host, the first command instructing data in the buffer to be forcibly written to the tape medium and the second command instructing delimiter information to be forcibly written to the tape medium;
computer usable program code configured to write the data, in the buffer and speculative delimiter information to the tape medium in response to receipt of the first command; and
computer usable program code configured to process the, speculative delimiter information as valid delimiter information when the second command is received after the first command.

17. The computer program product of claim 16, further comprising:
computer usable program code configured to record information in a recording medium, the information indicating that the speculative delimiter information is written to the tape medium; and computer usable program code configured to process the speculative delimiter information as valid delimiter information by erasing the information recorded in the recording medium.

18. The computer program product of claim 16, further comprising:
- computer usable program code configured to receive a third command, the third command instructing data to be stored in the buffer; and
- computer usable program code configured to disable the speculative delimiter information as valid delimiter information upon receipt of the third command after the first command; and
- computer usable program code configured to store data in the buffer so that the speculative delimiter information is overwritten by the data stored in the buffer.

19. The computer program product of claim 16, further comprising:
- computer usable program code configured to record information in a recording medium, the information indicating that the speculative delimiter information is written to the tape medium;
- computer usable program code configured to process the speculative delimiter information as valid delimiter information by erasing the information recorded in the recording medium;
- computer usable program code configured to receive a third command, the third command instructing data to be stored in the buffer;
- computer usable program code configured to disable the speculative delimiter information as valid delimiter information when the receiving unit receives a third command after the first command.

20. The computer program product of claim 16, further comprising:
- computer usable program code configured to overwrite the speculative delimiter information on the tape if a third command is received after the first command and before the second command; and computer usable program code configured to receive a fourth command, the fourth command comprising instructions for at least one of reading out delimiter information stored on the tape medium and locating the delimiter information.

\* \* \* \* \*